United States Patent Office 3,540,119
Patented Nov. 17, 1970

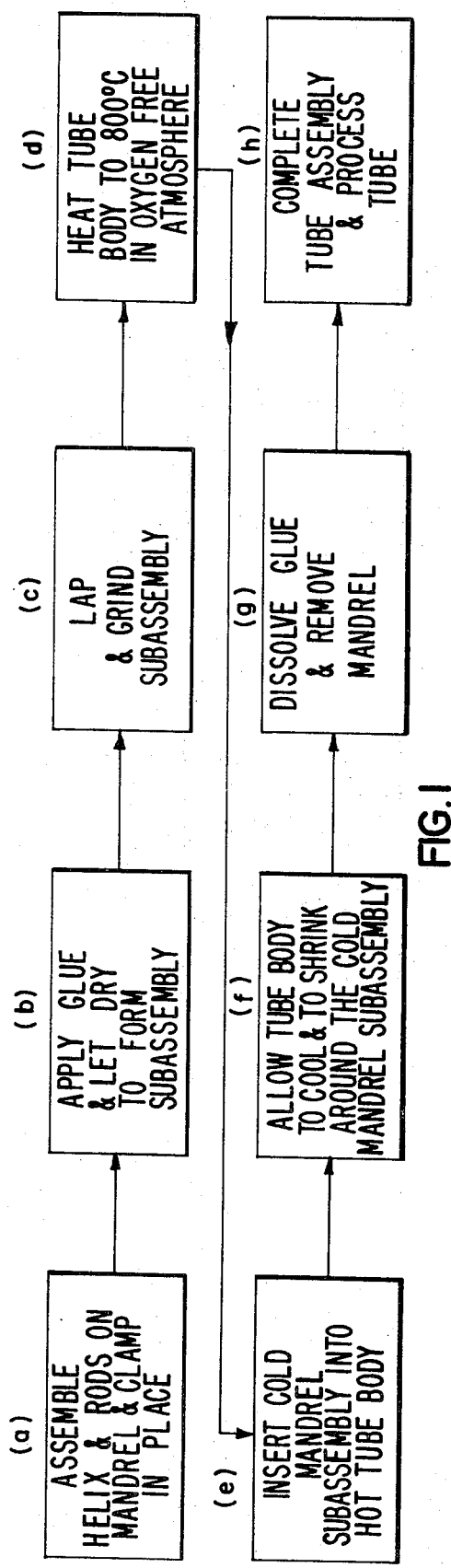
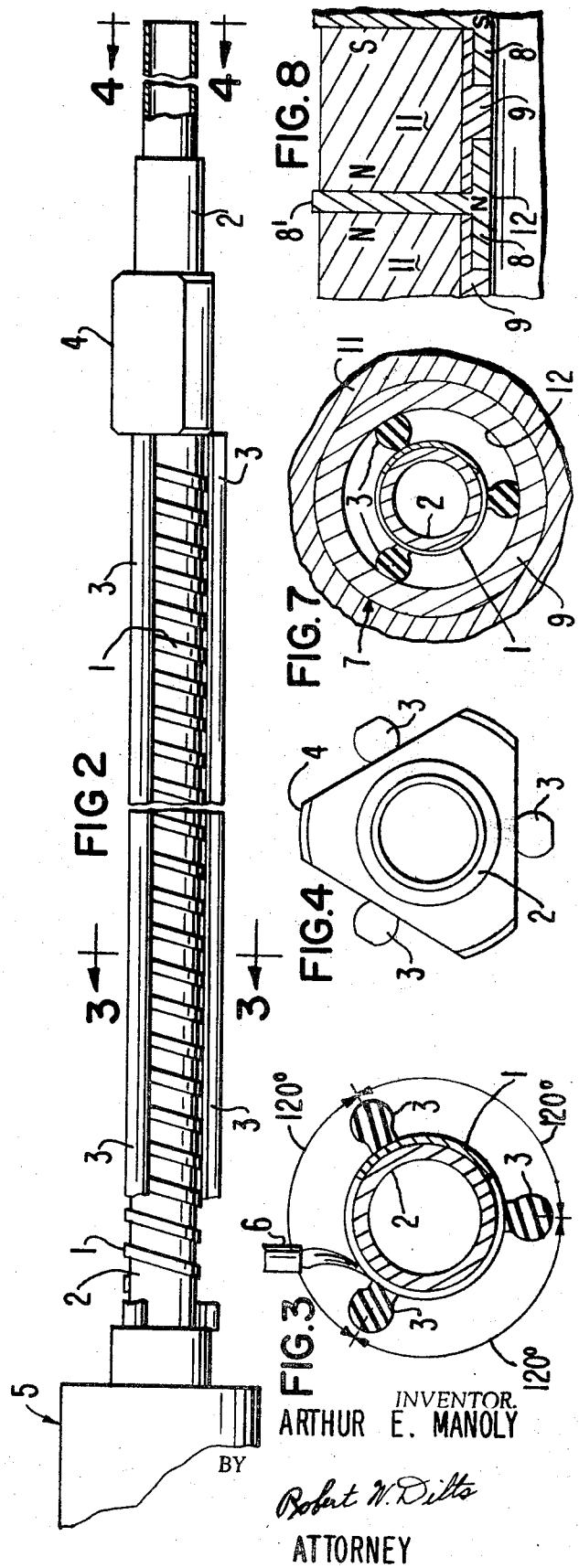

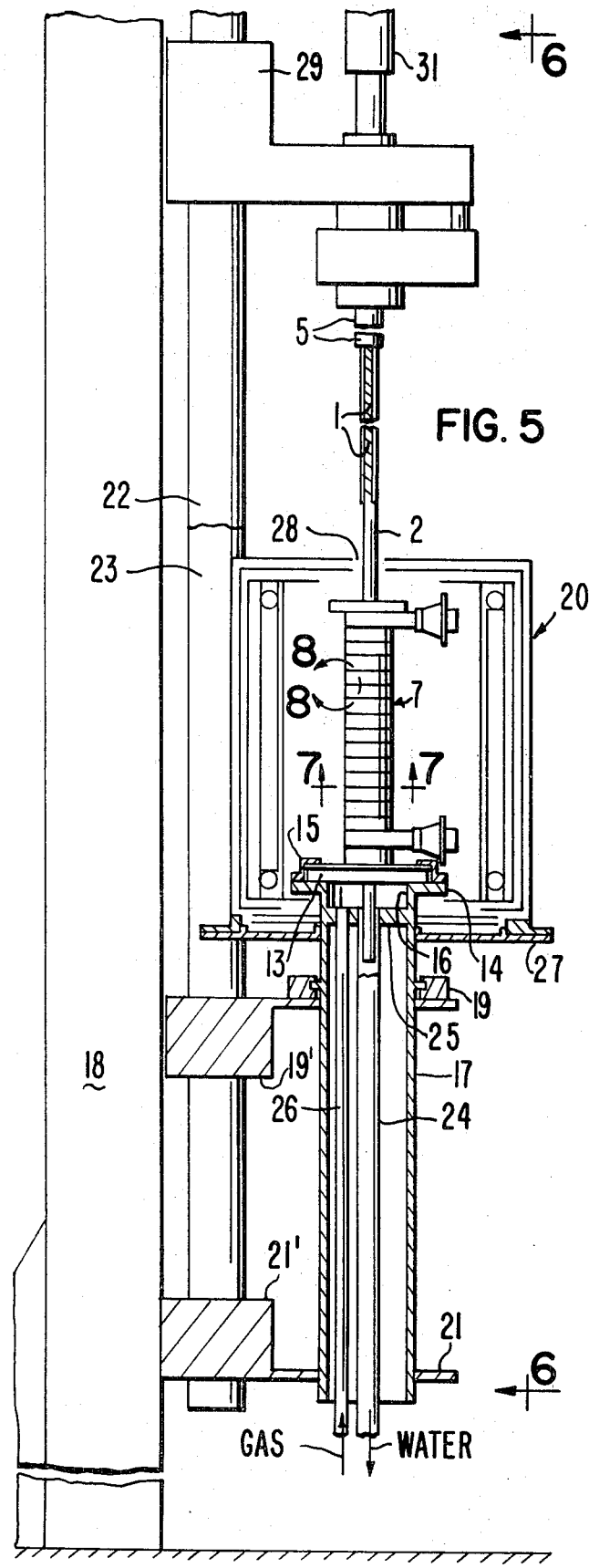
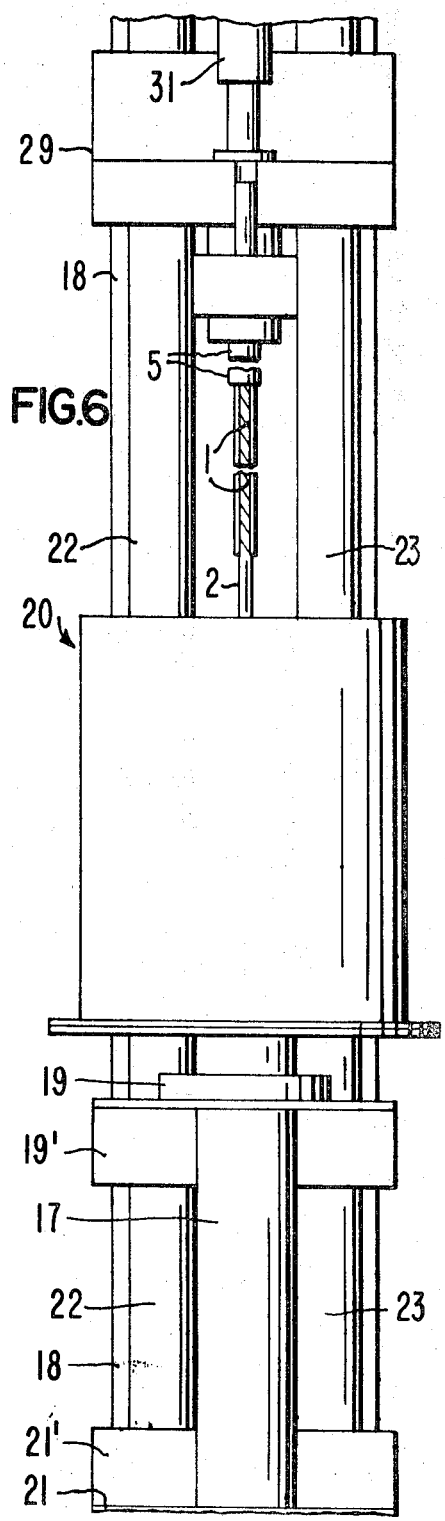

3,540,119
METHOD FOR FABRICATING MICROWAVE TUBES EMPLOYING HELICAL SLOW WAVE CIRCUITS
Arthur E. Manoly, Saratoga, Calif., assignor to Varian Associates, Palo Alto, Calif., a corporation of California
Filed Feb. 19, 1968, Ser. No. 706,447
Int. Cl. H01p 11/00
U.S. Cl. 29—600                                                 9 Claims

ABSTRACT OF THE DISCLOSURE

A method for shrink-fitting a slow wave circuit into a microwave tube body is disclosed. In the method, a slow wave circuit, such as a helix together with its support structure, such as three dielectric support rods, is glued onto a hollow mandrel to form an integral subassembly. A metallic microwave tube body having an elongated bore therein is heated to an elevated temperature as of 800° C. The glued subassembly is then axially inserted into the bore in the tube body while the tube body is maintained at an elevated temperature. A coolant is passed through the mandrel for cooling the subassembly to prevent melting of the glue and to facilitate insertion of the subassembly into the heated body portion. The body portion of the tube is then allowed to cool and to shrink around the subassembly to provide a tight shrink-fit therebetween for supporting the slow wave circuit. The tube body, containing the glued integral subassembly, is then washed in a solvent for the glue to remove the glue, thereby permitting the mandrel to be removed from the slow wave circuit to leave the slow wave circuit mounted within the bore in the body portion. Further assembly of the tube is then completed and the tube is processed.

DESCRIPTION OF THE PRIOR ART

Heretofore, helix type slow wave circuits together with their dielectric support rods have been shrunk-fit into longitudinal bores in the body of microwave tubes. In one prior art method, glass frit was applied to the helix and to the support rods. The support rods and helix were then clamped together and heated to 1100–1200° C. to produce a glazed joint between the support rods and the helix and to provide an integral subassembly. The tube body containing a longitudinal bore was then heated to approximately 800° C. and the subassembly was inserted into the bore in the tube's body. The tube's body was then allowed to cool and to shrink around the helix subassembly to produce an interference shrink-fit therebetween. The problem with this method for fabricating slow wave tubes is that the glazed joint produced between the support rods and the helix presents an R.F. loss to the circuit which increases with operating temperature. Thus, it is found that as the tube heats up to reach its operating temperature, the power output decreases, thereby providing an undesired fade characteristic in the output performance of the tube. In addition, the step of glazing the support rods to the helix is relatively expensive. Moreover, it is difficult to selectively apply an R.F. attenuating material for absorbing certain wave energy to the dielectric rods without inadvertently coating the attenuating material onto the circuit, since the rods cannot be coated with the attenuating material prior to the glazing step.

In another prior art method, which did not involve a shrink-fit of the slow wave circuit and its support structure within the barrel of the tube body, a helix was inserted onto a mandrel and the dielectric support rods were glued to the outside of the helix. Spring clip assemblies were then incorporated around the outside of the integral subassembly and the clips and subassembly were inserted into the longitudinal bore in a traveling wave tube body portion. The spring clips produced an inwardly directed spring bias force, causing the support rods to grip the outside of the helix, thereby supporting same from the inside wall of the bore in the tube body. A solvent was then applied to remove the glue and the mandrel was withdrawn. This prior art method is described in British Patent 1,030,043, issued May 18, 1966.

SUMMARY OF THE PRESENT INVENTION

The principal object of the present invention is the provision of an improved method for shrink-fitting slow wave circuits into the body of microwave tubes.

One feature of the present invention is the provision, in a method for shrink-fitting a slow wave circuit into a microwave tube body of the steps of, gluing the microwave slow wave circuit on a mandrel to form an integral subassembly, heating the tube body to an elevated temperature and inserting the glued slow wave circuit subassembly as carried on the mandrel into the bore in the tube body, cooling the mandrel and the integral slow wave circuit subassembly to prevent melting of the glue during the insertion step, allowing the tube body to cool around the cold slow wave circuit to produce a shrink-fit therebetween, and removing the glue and the mandrel to produce a completed slow wave portion of the tube.

Another feature of the present invention is the same as the preceding feature including the step of gluing support structure to the slow wave circuit on the mandrel prior to insertion of the mandrel and slow wave circuit subassembly into the bore of the heated body portion of the tube, whereby the glue between the mandrel and the slow wave circuit provides a thermally conductive path which facilitates cooling of the slow wave circuit and its support structure during the mandrel insertion and cooling steps.

Another feature of the present invention is the same as any one or more of the preceding features including the step of sizing the slow wave subassembly by grinding and lapping whereby a proper interference fit with the bore in the tube body is facilitated.

Another feature of the present invention is the same as any one or more of the preceding features including the step of coating the support structure with an R.F. lossy material prior to the step of gluing the support structure to the slow wave circuit, whereby the lossy material is prevented from being inadvertently coated onto the slow wave circuit.

Another feature of the present invention is the same as any one or more of the preceding features wherein the slow wave circuit is a helix and the support structure comprises three dielectric rods spaced at 120° intervals about the periphery of the helix and extending lengthwise thereof.

Other features and advantages of the present invention will become apparent upon a perusal of the following specification taken in connection with the accompanying drawings wherein:

BRIEF DESCRIPTION OF THE DRAWINGS

FIGURE 1 is a flow diagram, in block diagram form, depicting the method for fabricating microwave tubes according to the present invention, FIGURE 2 is a side elevational view, partly broken away and foreshortened, depicting a helix slow wave circuit together with its support structure as mounted on a mandrel, FIGURE 3 is a cross-sectional view of a portion of the structure of FIGURE 2, taken along line 3—3 in the direction of the arrows, FIGURE 4 is a view of the structure of FIGURE 2 taken along line 4—4 in the direction of the arrows, FIGURE 5 is a side elevational view, partly in section, depicting a method and apparatus for inserting a mandrel containing the slow wave circuit structure into the axial bore of a traveling wave tube, FIG. 6 is a view of the structure of FIG. 5 taken along line 6—6 in the direction of the arrows, FIG. 7 is an enlarged sectional view of a portion of the structure of FIG. 5 taken along line 7—7 in the direction of the arrows, and FIG. 8 is an enlarged sectional view of a portion of the structure of FIG. 5 designated by line 8—8.

DESCRIPTION OF THE PREFERRED EMBODIMENTS

Referring now to FIGS. 1–8, a method of the present invention is described for shrink-fitting a slow wave circuit into the body of a microwave tube. FIG. 1 describes the method in terms of a flow-type block diagram.

In step a, a helix type slow wave circuit 1 (see FIG. 2) is inserted over a hollow cylindrical steel mandrel 2. In a typical example, the helix 1 is made of a refractory metal, such as molybdenum or tungsten, formed into a tape like helix. The helix 1 has an outside diameter of 0.1452 inch and the tape has a thickness of 0.0073 inch and a length which will vary with the type of tube from 2 inches to 8 inches. Three dielectric support rods 3 are positioned at 120° intervals about the periphery of the helix 1 and are clamped against the helix by means of a clamp, not shown. The rods 3 should be made of a refractory dielectric material, such as beryllium oxide, alumina, boron nitride, or sapphire. The rods 3 are precoated with an R.F. lossy material such as carbon by pyrolytic deposition.

The mandrel 2 includes a triangular shaped guide member 4 disposed near one end. A cylindrical collar 5 is disposed at the opposite end. The flats on the triangular guide 4 are in axial alignment with the rods 3 around the helix 1 and the corners of the triangular shaped guide 4 are angularly spaced intermediate the rods 3 for guiding the helix and rod subassembly and the mandrel 2 into the bore of a tube portion, as more fully described below.

In step b, glue is applied to the rods 3 and helix 1 as clamped to the mandrel 2. A suitable glue includes methacrylate or butyl-methacrylate. The glue is conveniently applied by means of an artist brush 6 to the points of contact between the rods 3 and the helix 1 and also, in a preferred embodiment, to the points where the helix is clamped to the mandrel 2 by means of the support rods 3. The glue is allowed to dry to form an integral subassembly comprising the mandrel 2, the helix 1, and the support rods 3.

In step c, the outer surfaces of the subassembly are sized by grinding and lapping of the rods 3 to a proper overall diameter for the subassembly relative to the size of the bore in the tube's body, as of 0.219 inch. The outer surfaces of the rods 3 are lapped to provide relatively flat surfaces which are to be disposed adjacent the inner surface of the bore in the tube, as more fully described below.

In step d, the tube body portion 7, which is to receive the slow wave circuit, is first axially bored at 12 to a precise and constant inside diameter as by gun drilling following by precision honing. In a typical example (see FIGS. 7 and 8), the tube body 7 is made up of a tubular stack of magnetic and nonmagnetic metallic rings 8 and 9, such as vacuum cast steel and cupernickel spacers, respectively, which are brazed together to form a hollow tubular envelope structure 7. The pole members 8 include outwardly extending annular flange portions 8' which are located, in use, but not during insertion of the slow wave circuit, between axially split cylindrical permanent magnets 11, indicated in dotted lines in FIG. 8.

The tube body 7 (see FIGS. 5 and 6) includes a flange 13 at its lower end which is clamped to a table 14 via clamps 15. The table 14 includes a hollow central portion 16 and a dependent tubular portion 17. The table 14 is supported from a vertical channel-shaped beam 18 forming a stand via a pair of collars 19 and 21 around the dependent tubular extension 17 of the table 14. The lower collar 21 is fixedly secured to the vertical beam 18 of the stand and includes a double collar portion 21' fixedly supporting the ends of a pair of guide rails 22 and 23 which extend the length of the beam 18. The upper collar 19 includes a pair of axially directed bores forming a double collar portion 19', which slidably rides on the guide rails 22 and 23. The upper collar 19 is fixedly secured to the dependent tubular extension 17 of the table 14, whereas the lower collar 21 slidably receives on the dependent tube 17 for guidance of the tube 17. A coolant exhaust tube 24 is centrally disposed of the dependent tube 17 and is supported at its upper end from a transverse header 25 mounted transversely of the tube 17. A forming gas inlet tube 26, also passes axially through the dependent tube 17 and through the header 25 for admitting forming gas into the region surrounding the tube body 7.

An over 20 encloses the tube body 7, the upper portion of the dependent tube 17 and the table 14. The oven rests on a flange 27 fixed to the depednent tube 17 below the table 14. The dependent tube 17 is heat choked by means of transverse slots passing through the walls of the tube 17 to provide a tortuous path for the flow of heat from the table 14 to the tube 17 and thus, out of the oven 20. In addition, suitable heat shields are provided between the oven 20 and the flange 27. The oven 20 makes a gastight seal with flange 27. An access opening 28 is provided in the center of the upper wall of the oven 20 in axial alignment with bore 12 in the tube body 7. The mandrel 2, containing the helix and rod subassembly, is axially aligned with the bore 12 in the tube body portion 7. The mandrel 2 is affixed to a carriage 29 which slides along the guide rails 22 and 23.

In step e, a coolant inlet tube 31 is connected in fluid communication with the central bore in the mandrel 2 for providing a flow of coolant, such as room temperature water, to the mandrel for cooling same in use. The mandrel 2, with the helix 1 and rod subassembly glued thereto, is lowered through the hole 28 in the oven 20, such that a tubular extension of the mandrel 2 passes through the tube body 7 and engages the upper end of the coolant outlet pipe 24. With the mandrel in this position, the helix and rod subassembly is still outside of the oven 20, and with the mandrel in this position, the flow of coolant to the mandrel 2 is started such that the mandrel 2 is cooled to the temperature of the coolant, for example, room temperature. The oven 20 with a forming gas atmosphere therein consisting of 95% nitrogen and 5% hydrogen gases introduced via pipe 26 has heated the tube body to between 700 and 800° C. It typically takes approximately 30 minutes for the oven and tube body 7 to reach thermal equilibrium. With the coolant flowing through the mandrel 2 and with the tube body 7 at approximately 800° C., the mandrel 2 is then lowered all the way into the oven 20 and tube body 7. The proper depth for insertion of the helix 1 is controlled by the position of the lower shoulder of the collar portion 5 of the mandrel 2.

With the tube body 7 heated to 800° C., the bore 12 will be expanded to a larger inside diameter than that obtained at room temperature. The outside diameter of the slow wave circuit subassembly is sized to approximately 1.3 mills less than the expanded inside diameter of the heated bore 12.

In step f, the heat applied to the oven 26 is removed and the oven is allowed to cool to room temperature.

Meanwhile the mandrel 2 and the slow wave circuit are continuously cooled by means of the coolant to prevent melting of the glue. During the cooling process, the body portion 7 of the tube shrinks around the slow wave circuit subassembly to produce a tight interference fit between the subassembly and the inside of the bore 12.

In step g, the tube body 7 together with the mandrel 2 and the slow wave circuit subassembly are removed from the oven and washed with a solvent for the glue, such as acetone or methyl-ethyl-ketone solvent to dissolve the glue and to facilitate removal of the mandrel 2.

In step h, the tube body portion 7 containing the helix 1 and support rods 3 is assembled to the remaining portion of the tube and the tube is processed in a conventional manner.

Although, in a preferred embodiment of the present invention, the helix and rod subassembly were glued together on the mandrel 2, this is not a requirement. More particularly, it is possible to glue only the helix 1 and rods 3 together, or otherwise form a slow wave structure, prior to gluing it to the mandrel 2. It will be understood the glue facilitates the transfer of heat from the rods 3 and helix 1 to the mandrel 2 to prevent melting of the glue during steps e and f and in addition provides a rigid structure during step c since the mandrel 2 is slightly undersize (e.g., two mills) to facilitate its eventual removal.

The advantages of the present method are that they permit heat shrinking of a tubular vacuum envelope portion around a slow wave circuit subassembly without the necessity of providing a glaze between the rods and the circuit. Elimination of the glaze avoids undesired R.F. losses associated with the glaze. Moreover, avoiding the use of the glaze permits the lossy R.F. attenuating material to be applied to the dielectric support rods 3 before the gluing step and, thus, a more precise control over the application of the R.F. lossy material is obtained, thereby further reducing R.F. losses associated with the slow wave circuit. Furthermore, use of the glue, as opposed to the use of the prior glaze, results in a less expensive fabrication method, as it eliminates the high temperature glazing step, which required that the helix subassembly be heated to 1100° to 1200° C. and often resulted in a relatively low production yield.

Although the method of the present invention has been described as employed for a slow wave circuit of the helix type, this is not a requirement. This method is applicable to other types of slow wave circuits, such as helix derived circuits, which would include bifilar helices, a ring and bar circuit, cross-wound helices, etc. Also, the circuit support structure need not be dielectric rods 3 but may take many other shapes of dielectric or metallic material.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a method for fabricating microwave tubes which employ slow wave circuit the steps of, gluing a slow wave circuit subassembly on a mandrel, heating a body portion of the microwave tube structure to an elevated temperature, inserting the glued integral slow wave circuit subassembly, as carried on the mandrel, into a bore in the heated body portion of the microwave tube, passing a coolant through the mandrel for cooling the slow wave circuit subassembly to prevent melting of the glue and to facilitate insertion of the slow wave circuit subassembly into the heated body portion, allowing the body portion of the tube to cool and to shrink around the slow wave circuit subassembly to provide a tight interference fit therebetween, removing the glue, and removing the mandrel to leave the slow wave circuit and its associated support structure mounted within the bore in the tube body portion.

2. The method of claim 1, wherein the step of removing the glue includes a step of, washing the glued subassembly, as mounted in the bore within the tube body portion, with a solvent for the glue.

3. The method of claim 1, wherein the glue is selected from the class consisting of methacrylate lacquer and butyl-methacrylate.

4. The method of claim 1, wherein the step of heating a body portion of the tube for insertion of the subassembly includes raising its temperature to above 700° C.

5. The method of claim 1 wherein the slow wave circuit subassembly comprises support structure and the step of gluing said subassembly on a mandrel includes the step of gluing said support structure to said slow wave circuit.

6. The method of claim 5 including the step of, coating the suppport structure with a material which is lossy to radio frequency energy prior to the step of gluing the support structure and slow wave circuit together to form the slow wave circuit subassembly.

7. The method of claim 5, wherein the slow wave circuit is a helix and the support structure comprises three dielectric rods spaced at 120° intervals about the periphery of the helix and extending lengthwise of the helix.

8. The method of claim 1, wherein the body portion of the tube comprises an elongated metallic barrel structure.

9. The method of claim 1 wherein the additional step of sizing the slow wave circuit subassembly after the step of gluing on a mandrel and before the step of inserting into a bore in the heated body portion of the microwave tube.

References Cited

UNITED STATES PATENTS

| | | | |
|---|---|---|---|
| 2,869,217 | 1/1959 | Sanders. | |
| 3,018,541 | 1/1962 | Hunt et al. | 29—447 XR |
| 3,268,986 | 8/1966 | Lacy | 29—423 |
| 3,302,268 | 2/1967 | Duinker | 29—423 XR |
| 3,300,677 | 1/1967 | Karol et al. | |
| 3,327,371 | 6/1967 | Keras et al. | 29—600 |
| 3,293,478 | 12/1966 | Winkler | 29—600 XR |
| 3,345,732 | 10/1967 | Brower | 29—447 XR |
| 3,394,453 | 7/1968 | Wallace et al. | 29—600 |

JOHN F. CAMPBELL, Primary Examiner

R. W. CHURCH, Assistant Examiner

U.S. Cl. X.R.

29—25.18, 423, 424, 447